US011256148B2

(12) United States Patent
Hou

(10) Patent No.: US 11,256,148 B2
(45) Date of Patent: Feb. 22, 2022

(54) TRANSPARENT DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventor: Jun Hou, Shenzhen (CN)

(*) Notice: Subject to any disclaimer, the term of this patent is extended or adjusted under 35 U.S.C. 154(b) by 209 days.

(21) Appl. No.: 16/625,771

(22) PCT Filed: Nov. 13, 2019

(86) PCT No.: PCT/CN2019/117864
§ 371 (c)(1),
(2) Date: Dec. 23, 2019

(87) PCT Pub. No.: WO2021/082075
PCT Pub. Date: May 6, 2021

(65) Prior Publication Data
US 2021/0333603 A1 Oct. 28, 2021

(30) Foreign Application Priority Data
Oct. 30, 2019 (CN) .......................... 201911042609.4

(51) Int. Cl.
*G02F 1/1343* (2006.01)
*G02F 1/1335* (2006.01)
*G02F 1/1337* (2006.01)
(52) U.S. Cl.
CPC ........ *G02F 1/13439* (2013.01); *G02F 1/1337* (2013.01); *G02F 1/133614* (2021.01); *G02F 1/134309* (2013.01)

(58) Field of Classification Search
CPC ........... G02F 1/13439; G02F 1/133614; G02F 1/1337; G02F 1/134309
See application file for complete search history.

(56) References Cited

U.S. PATENT DOCUMENTS

| 2004/0213536 | A1* | 10/2004 | Zoorob ................ G02B 6/1225 385/131 |
| 2014/0145144 | A1* | 5/2014 | Jeong .................. H01L 29/0673 257/13 |
| 2017/0146858 | A1 | 5/2017 | Liu |
| 2017/0162133 | A1* | 6/2017 | Sekiguchi .............. G02B 6/005 |
| 2017/0242284 | A1* | 8/2017 | Yang .................. G02F 1/13362 |
| 2017/0255051 | A1 | 9/2017 | Liu |
| 2017/0255060 | A1* | 9/2017 | Kim .................. G02F 1/133514 |
| 2017/0307939 | A1 | 10/2017 | Banin et al. |
| 2020/0241363 | A1 | 7/2020 | Ma et al. |

FOREIGN PATENT DOCUMENTS

| CN | 105068330 A | 11/2015 |
| CN | 105093623 A | 11/2015 |
| CN | 106796369 A | 5/2017 |
| CN | 107340662 A | 11/2017 |
| CN | 107817629 A | 3/2018 |
| CN | 108535911 A | 9/2018 |
| CN | 110383154 A | 10/2019 |

\* cited by examiner

*Primary Examiner* — Lucy P Chien

(57) ABSTRACT

A transparent display device includes a first transparent electrode layer, a second transparent electrode layer disposed opposite to the first transparent electrode layer, and a liquid crystal mixture layer disposed between the first transparent electrode layer and the second transparent electrode layer, wherein the liquid crystal mixture layer includes liquid crystal molecules and quantum rods.

11 Claims, 1 Drawing Sheet

TRANSPARENT DISPLAY DEVICE

FIELD OF INVENTION

The present invention relates to the field of display technology, and more particularly, to a transparent display device.

BACKGROUND OF INVENTION

With the rapid development of display field, various types of display devices have gradually crowded into the market. Among them, transparent display devices have received more and more attention because of their unique performance.

Transparent liquid crystal displays (LCDs) can display additional information without affecting the visibility of objects behind the LCDs. They can be used in display windows in supermarkets or shops, perspective refrigerator doors, etc., and they can also be used to create transparent boxes, decorative glass-lamps and other creative equipment in many fields. Consumers can enjoy the convenience brought by this technological innovation.

The technical problem is that the existing transparent LCDs usually retain a color filter (CF) layer or add white pixels, and an upper polarizer and a lower polarizer are also retained for displaying colors. Such a design inevitably reduces the transparency of the LCDs and affects their display effect.

SUMMARY OF INVENTION

In order to resolve the problems, the technical solutions provided by the present invention are as follows:

The present invention provides a transparent display device, including a first transparent electrode layer, a second transparent electrode layer disposed opposite to the first transparent electrode layer, and a liquid crystal mixture layer disposed between the first transparent electrode layer and the second transparent electrode layer. The liquid crystal mixture layer comprises liquid crystal molecules and quantum rods.

According to one preferred embodiment of the present invention, the quantum rods are CdSe quantum rods.

According to one preferred embodiment of the present invention, the quantum rods are of hollow structures and are filled with the liquid crystal molecules.

According to one preferred embodiment of the present invention, a ratio of a mass of the quantum rods to a mass of the liquid crystal molecules ranges from 0.1% to 10%.

According to one preferred embodiment of the present invention, a ratio of a long axis to a short axis in size is greater than 2 for each of the quantum rods.

According to one preferred embodiment of the present invention, a ratio of a long axis to a short axis in size is greater than 10 for each of the quantum rods.

According to one preferred embodiment of the present invention, the size of the long axis of each of the quantum rods is greater than 20 nm and less than 100 nm, and the size of the short axis of each of the quantum rods is less than 10 nm.

According to one preferred embodiment of the present invention, the transparent device further includes a backlight module, wherein the quantum rods receive the light from the backlight module and then self-illuminate.

According to one preferred embodiment of the present invention, the quantum rods receive the light from the backlight module and then self-illuminate with different colors according to the size of the quantum rods.

According to one preferred embodiment of the present invention, the transparent device further includes a first alignment layer disposed at an inner side of the first transparent electrode layer close to the liquid crystal mixture layer and a second alignment layer disposed at an inner side of the second transparent electrode layer close to the liquid crystal mixture layer.

According to one preferred embodiment of the present invention, the transparent device further includes a thin film transistor layer, disposed at an outer side of the first transparent electrode layer away from the liquid crystal mixture layer.

According to one preferred embodiment of the present invention, when no electric field is applied between the first transparent electrode layer and the second transparent electrode layer, a long axis of the liquid crystal molecules is perpendicular to the first transparent electrode layer and the second transparent electrode layer.

According to one preferred embodiment of the present invention, the transparent device includes a pixel area and a non-pixel area, wherein the liquid crystal mixture layer is disposed on the pixel area.

The beneficial effect is that after removing an upper polarizer, a lower polarizer, and a color filter that are disposed in the traditional display device, a normal display still can be realized by doping quantum rods in the liquid crystal layer, thereby realizing a higher transparent display effect. Specifically, an electric field is used to control the twist of liquid crystals to drive the twist of quantum rods, and an area receiving the irradiation from backlight varies with different twist levels of the quantum rods, that is, the intensity receiving the irradiation from the backlight will be various, which leads to different intensity of self-illumination, so a light and dark contrast is generated to realize displaying. Therefore, the transparent display device provided by the present invention has higher transparency and optimizes a visual experience of the transparent display device. Furthermore, because processes of the upper polarizer, the lower polarizer, and the color filter are omitted, process time and costs can be saved.

DESCRIPTION OF DRAWINGS

In order to clearly illustrate embodiments or technical solution in the prior art, a brief description of drawings used in the embodiments or the description of the prior art would be given as below. Obviously, the drawings in the following description are merely some embodiments of the invention. For persons skilled in this art, other drawings can be obtained from these drawings under the premise of no creative effort made.

DETAILED DESCRIPTION OF PREFERRED EMBODIMENTS

Figure 1:
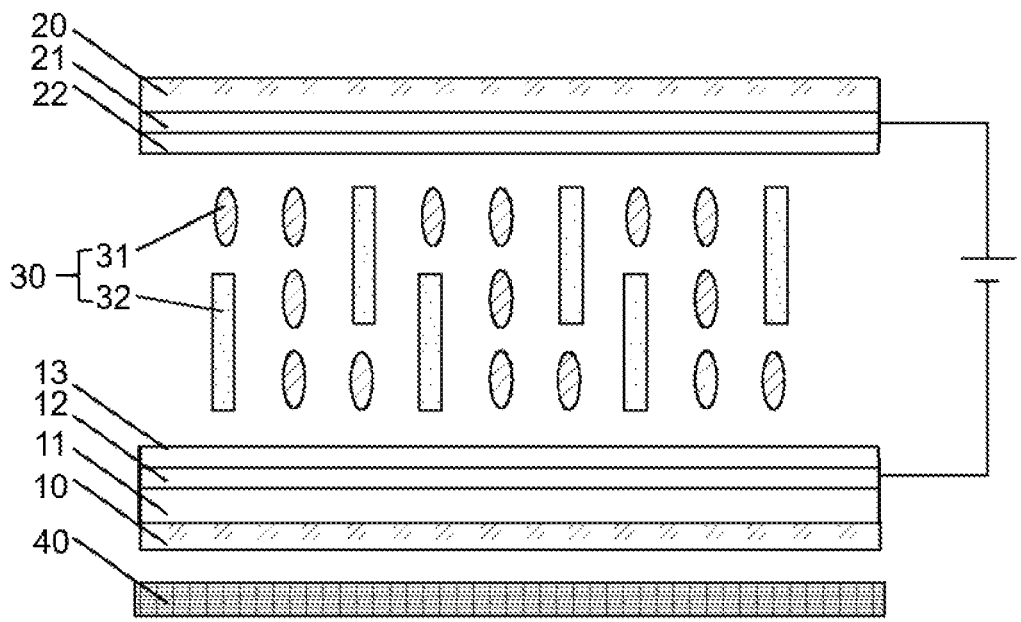
FIG. 1 is a schematic structural diagram showing a working state of a transparent display device according to an embodiment of the present invention.

The following descriptions for the respective embodiments are specific embodiments capable of being implemented for illustrating the present disclosure with referring to the appending drawings. The spatially relative terms mentioned in the present invention, such as "upper", "lower", "front", "back", "left", "right", "inner", "outer", "lateral" are only directions with referring to the accompanying drawings. Therefore, the spatially relative terms used are merely for describing and understanding the present invention, it is not intended to limit the present invention. In the drawings, units with similar structure are represented by the same label.

The present invention provides a transparent display device, including a first transparent electrode layer 12, a second transparent electrode layer 21 disposed opposite to the first transparent electrode layer 12, and a liquid crystal mixture layer 30 disposed between the first transparent electrode layer 12 and the second transparent electrode layer 21, wherein the liquid crystal mixture layer 30 includes liquid crystal molecules 31 and quantum rods 32.

A material of the first transparent electrode 12 and the second transparent electrode layer 21 may be indium tin oxide (ITO). A vertical electric field is applied to the liquid crystal mixture layer 30 to control the twist direction of the liquid crystal molecules 31 without reducing transparency.

In the present embodiment, above the first transparent electrode 12, that is, an inner side of the first transparent electrode layer 12 close to the liquid crystal mixture layer 30, a first alignment layer 13 is further included. Below the first transparent electrode 12, that is, an outer side of the first transparent electrode layer 12 away from the liquid crystal mixture layer 30, a thin film transistor 11 and a first substrate 10 are further included in sequence. Below the second transparent electrode 21, that is, an inner side of the second transparent electrode layer 21 close to the liquid crystal mixture layer 30, a second alignment layer 22 is further included. Above the second transparent electrode 21, that is, an outer side of the second transparent electrode layer 21 away from the liquid crystal mixture layer 30, a second substrate 20 is further included.

The thin film transistor 11 may adopt regular selections in the field, and the regular selections generally include a gate electrode, a source/drain electrode, an active layer, an insulation layer, etc., which is not limited in the present application Furthermore, the first substrate 10 and the second substrate 20 may be a rigid glass or a resin substrate, or may also be a flexible polyimide substrate. The present application is not limited to this, and it can be selected according to actual needs.

Besides, by providing the first alignment layer 13 and the second alignment layer 22, which work together, the liquid crystal molecules 31 are twisted in a predetermined direction. Specifically, when an electric power is not applied, that is, when the bias voltage applied between the first transparent electrode 12 and the second transparent electrode 21 is 0V, the liquid crystal molecules 31 are in a "standing" state, referring to FIG. 1 for details.

In the present embodiment, optionally, the quantum rods 32 are CdSe quantum rods.

Furthermore, the quantum rods 32 are of hollow structures and are filled with the liquid crystal molecules 31. According to this design, an arrangement direction of the quantum rods 32 will change as the liquid crystal molecules 31 twist. For example, when the liquid crystal molecules 31 are in a "standing" state, the quantum rods 32 are also in a "standing" state.

Besides, a ratio of a mass of the quantum rods 32 to a mass of the liquid crystal molecules 31 ranges from 0.1% to 10%. Preferably, the ratio of the mass of the quantum rods 32 to the ratio of the mass of the liquid crystal molecules 31 ranges from 0.5% to 5% for best display effects.

In the present embodiment, the transparent display device further includes a backlight module 40 for irradiating light to the liquid crystal mixture layer 30. The quantum rods 32 within the liquid crystal mixture layer 30 receive the light from the backlight module 40 and then are excited to self-illuminate, thereby realizing display.

In the present embodiment, the key point of the size design of the quantum rods 32 is that the size of a long axis divided by the size of a short axis is greater than 2 for each of the quantum rods. Preferably, the size of the long axis divided by the size of the short axis is greater than 10 for each of the quantum rods. More preferably, the size of the long axis divided by the size of the short axis is greater than 20 for each of the quantum rods.

Specifically, the size of the long axis of each of the quantum rods is greater than 20 nm and less than 100 nm, and the size of the short axis of each of the quantum rods is less than 10 nm.

Figure 2:
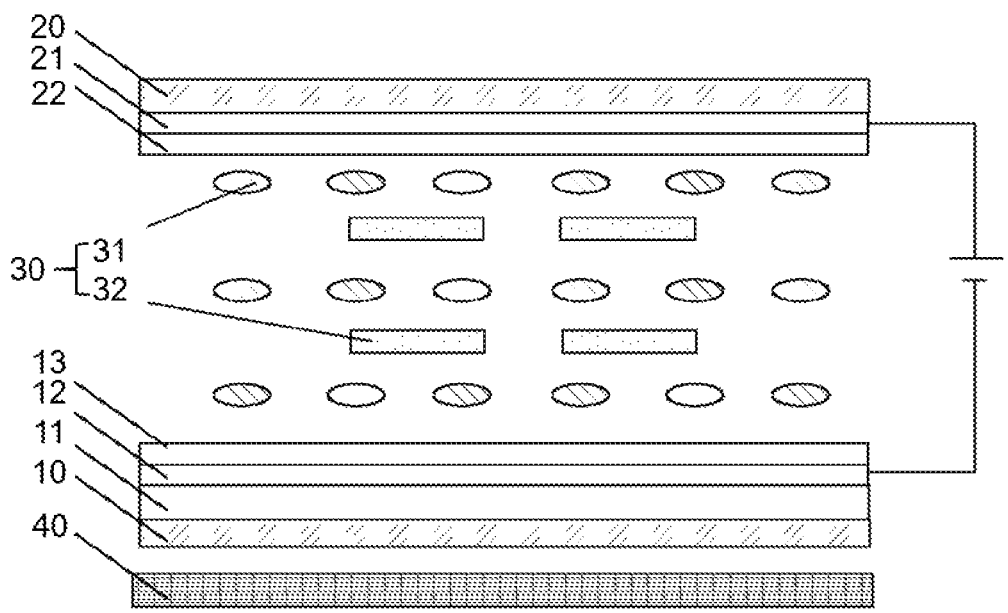
FIG. 2 is a schematic structural diagram showing another working state of the transparent display device according to an embodiment of the present invention.

According to this design, when the bias voltage applied between the first transparent electrode 12 and the second transparent electrode 21 is 0V, the liquid crystal molecules 31 are in a "standing" state, and the quantum rods 32 are also in a "standing" state. Because of the smaller size of the short axis, an area of the quantum rods 32 receiving the irradiation from the backlight module 40 is extremely small, and it can only self-illuminate a faint fluorescence. Conversely, when the bias voltage applied between the first transparent electrode 12 and the second transparent electrode 21 is great enough, the liquid crystal molecules 31 are in a "lying" state, and the quantum rods 32 are also in a "lying" state, referring to FIG. 2 for details. Because of the design that the size of the long axis 32 is greater than the size of the short axis for each of the quantum rods, an area of the quantum rods 32 receiving the irradiation from the backlight module 40 is large, and it can self-illuminate stronger fluorescence.

According to the above, it can be understood that by controlling the bias voltage applied between the first transparent electrode 12 and the second transparent electrode 21 to control the twist direction of the liquid crystal molecules 31, the twist direction of the quantum rods 32 is controlled. The area receiving the light from the backlight module 40 varies with different twist levels of the quantum rods 32, that is, the intensity of self-luminous fluorescence is also different, so a light and dark contrast is generated to realize displaying.

In the present embodiment, the quantum rods 32 receive the light from the backlight module 40 and then self-illuminate with different colors according to the size of the quantum rods 32. Specifically, a full-color display still can be realized by designing red quantum rods, green quantum rods, and blue quantum rods after removing a color filter, which also prevents the problem of reducing display transparency caused by the presence of the color filter. Besides, it should be noted that the transparent display device in the embodiment of the present invention may be designed as a monochrome display or a color display according to actual needs, which is not limited in the present invention.

In the present embodiment, the transparent display device includes a pixel area and a non-pixel area, wherein the liquid crystal mixture layer are disposed on the pixel area.

It should be noted that the transparent display device in the embodiment mentioned above only describes the above structure. It should be understood that in addition to the above structure, the transparent display device provided by the embodiment of the present invention may further include any other necessary structures according to requirements, which is not specifically limited herein.

In accordance with the transparent display device described above in the embodiment, after removing an upper polarizer, a lower polarizer, and a color filter that are disposed in the traditional display device, a normal display still can be realized by doping quantum rods in the liquid crystal layer, thereby realizing a higher transparent display effect.

The transparent display device provided by the embodiment of the invention is further described in detail above. The specific examples are used herein to explain the principle and implementation of the present invention. The description of the embodiment is only used to help understand the approach and core idea thereof of the present invention. For persons skilled in this art, according to the idea of the present invention, there will be changes in the specific implementation and application scope. Above all, the contents of this specification should not be construed as limiting the invention.

What is claimed is:

1. A transparent display device, comprising:
   a first transparent electrode layer;
   a second transparent electrode layer, disposed opposite to the first transparent electrode layer;
   a liquid crystal mixture layer, disposed between the first transparent electrode layer and the second transparent electrode layer, comprising liquid crystal molecules and quantum rods; and
   a backlight module, wherein the quantum rods receive light from the backlight module and then self-illuminate,
   wherein the quantum rods are of hollow structures and are filled with the liquid crystal molecules.

2. The transparent display device as claimed in claim 1, wherein the quantum rods are CdSe quantum rods.

3. The transparent display device as claimed in claim 1, wherein a ratio of a mass of the quantum rods to a mass of the liquid crystal molecules ranges from 0.1% to 10%.

4. The transparent display device as claimed in claim 1, wherein a ratio of a long axis to a short axis in size is greater than 2 for each of the quantum rods.

5. The transparent display device as claimed in claim 1, wherein a ratio of a long axis to a short axis in size is greater than 10 for each of the quantum rods.

6. The transparent display device as claimed in claim 4, wherein the size of the long axis of each of the quantum rods is greater than 20 nm and less than 100 nm, and the size of the short axis of each of the quantum rods is less than 10 nm.

7. The transparent display device as claimed in claim 1, wherein the quantum rods receive the light from the backlight module and then self-illuminate with different colors according to a size of the quantum rods.

8. The transparent display device as claimed in claim 1, further comprising:
   a first alignment layer, disposed at an inner side of the first transparent electrode layer close to the liquid crystal mixture layer; and
   a second alignment layer, disposed at an inner side of the second transparent electrode layer close to the liquid crystal mixture layer.

9. The transparent display device as claimed in claim 1, further comprising a thin film transistor layer, disposed at an outer side of the first transparent electrode layer away from the liquid crystal mixture layer.

10. The transparent display device as claimed in claim 1, wherein when no electric field is applied between the first transparent electrode layer and the second transparent electrode layer, a long axis of the liquid crystal molecules is perpendicular to a direction of the first transparent electrode layer and the second transparent electrode layer.

11. The transparent display device as claimed in claim 1, further comprising a pixel area and a non-pixel area, wherein the liquid crystal molecules are disposed on the pixel area.

* * * * *